United States Patent [19]
Beim et al.

[11] Patent Number: 5,809,835
[45] Date of Patent: Sep. 22, 1998

[54] MANUAL TRANSMISSION SHIFT LEVER

[75] Inventors: Rudolf Beim, Bloomfield Hills; David A. Janson, Plymouth, both of Mich.

[73] Assignee: Ford Global Technologies, Inc., Dearborn, Mich.

[21] Appl. No.: 781,366

[22] Filed: Jan. 21, 1997

[51] Int. Cl.⁶ .................................................. F16H 59/04
[52] U.S. Cl. ..................... 74/335; 74/473.18; 477/115; 477/121
[58] Field of Search ................ 74/335, 473.18; 477/115, 121

[56] References Cited

U.S. PATENT DOCUMENTS

| | | | |
|---|---|---|---|
| 4,930,078 | 5/1990 | Dunkley et al. | 364/424.1 |
| 5,042,327 | 8/1991 | Stainton | 74/866 |
| 5,050,079 | 9/1991 | Steeby | 364/424.1 |
| 5,271,291 | 12/1993 | Knape | 74/477 |
| 5,406,861 | 4/1995 | Steeby | 74/336 R |
| 5,406,862 | 4/1995 | Amsallen | 74/336 R |
| 5,429,559 | 7/1995 | Steeby | 477/80 |
| 5,441,464 | 8/1995 | Markyvech | 477/109 |
| 5,680,307 | 10/1997 | Issa et al. | 74/473.18 X |

*Primary Examiner*—Allan D. Herrmann
*Attorney, Agent, or Firm*—James J. Dottavio

[57] ABSTRACT

A shift mechanism is provided for requesting an upshift and a downshift in a multiple gear ratio transmission of a motor vehicle. The mechanism comprises a shift lever for requesting a gear change, a controller for determining the proper gear ratio and for causing the proper gear ratio to be engaged when the shift lever is moved to request a gear ratio change, and a shift gate for directing the travel of the shift lever in a pattern including an upshift plane, a downshift plane and a delay position therebetween.

15 Claims, 8 Drawing Sheets

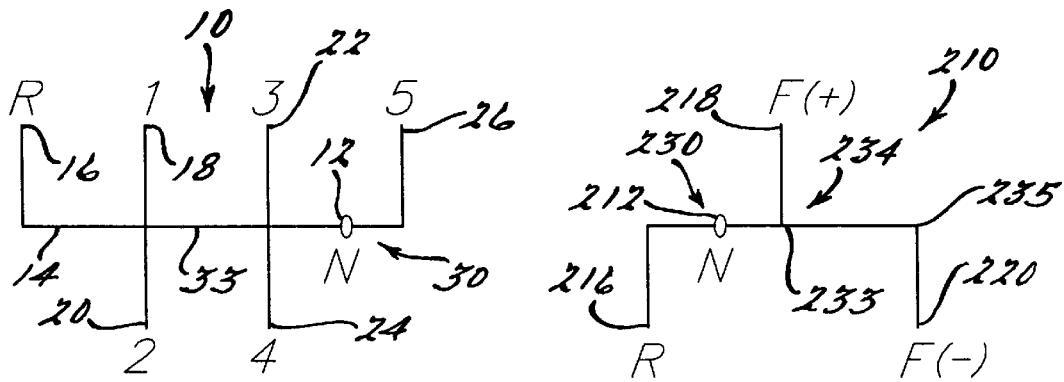
FIG. 1. Prior Art
FIG. 2.
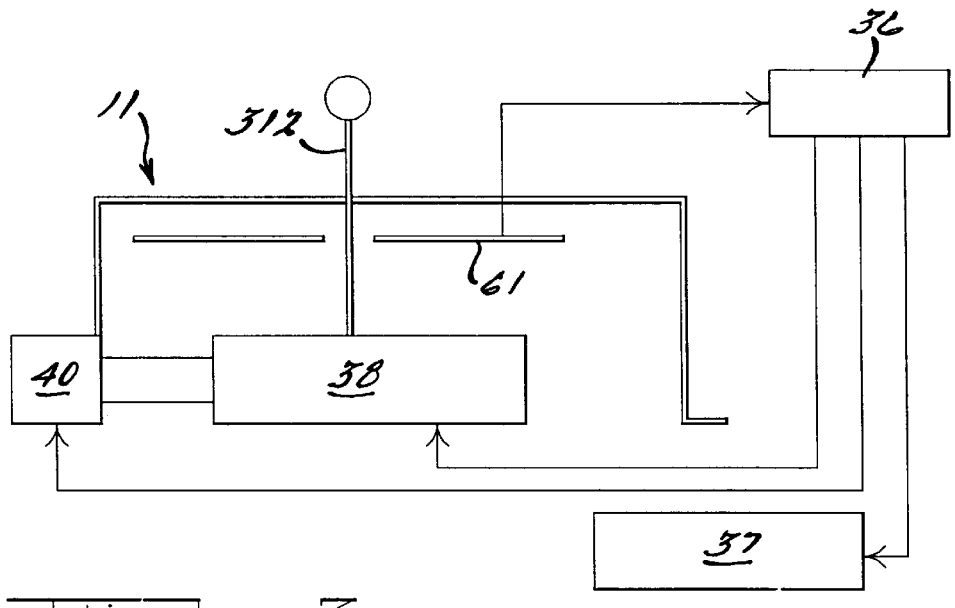
FIG. 3.
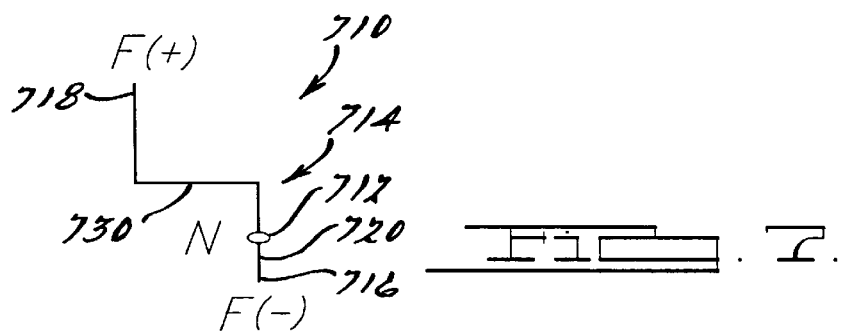
FIG. 7.

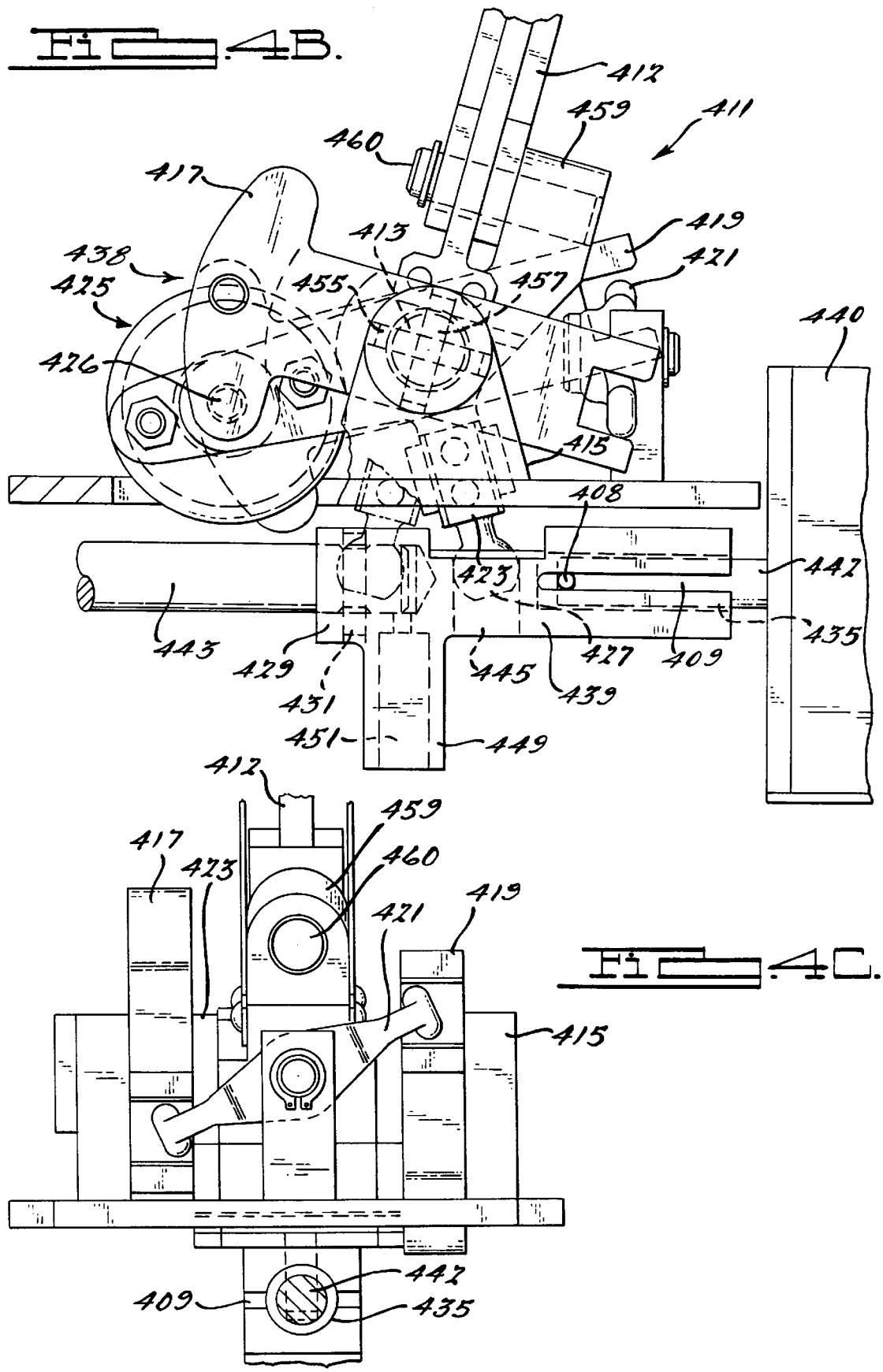

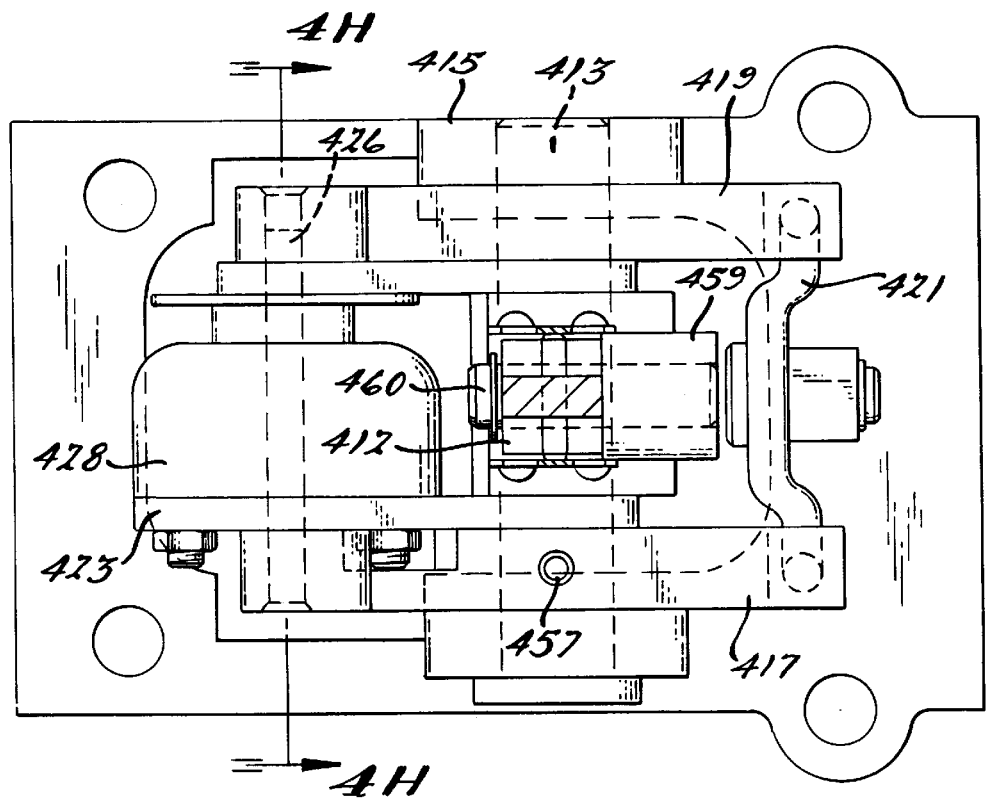
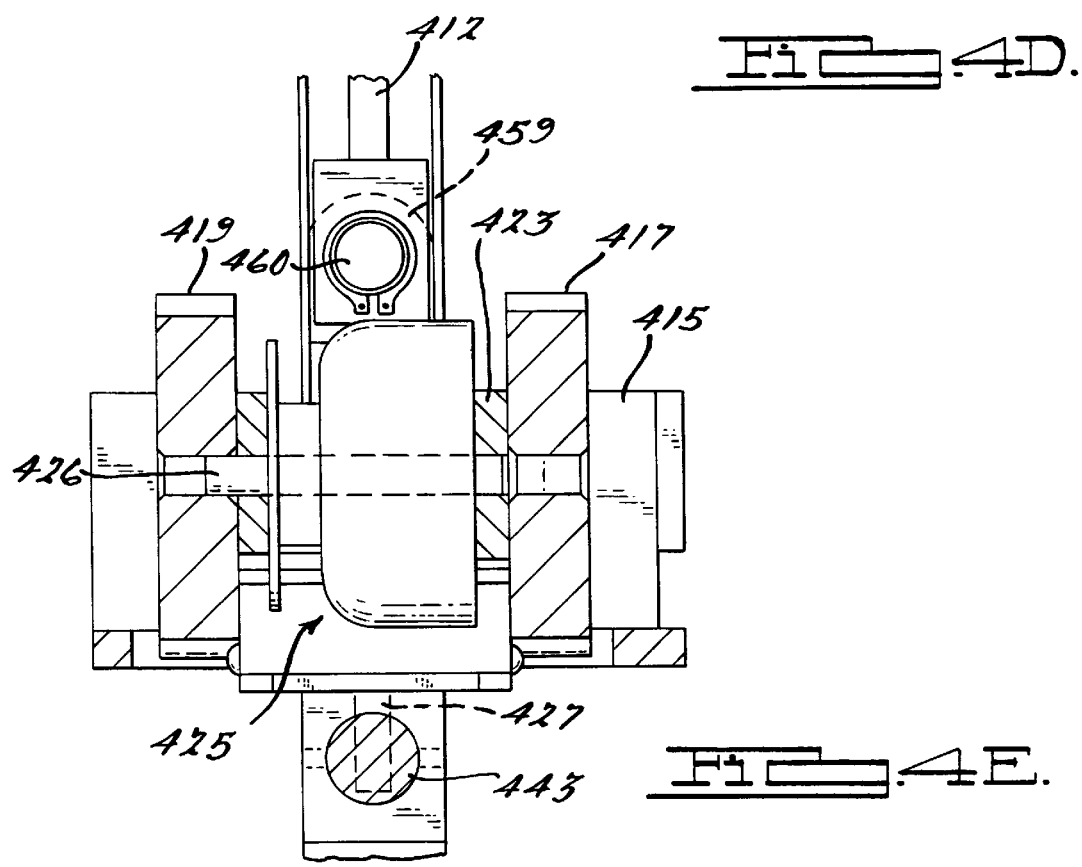

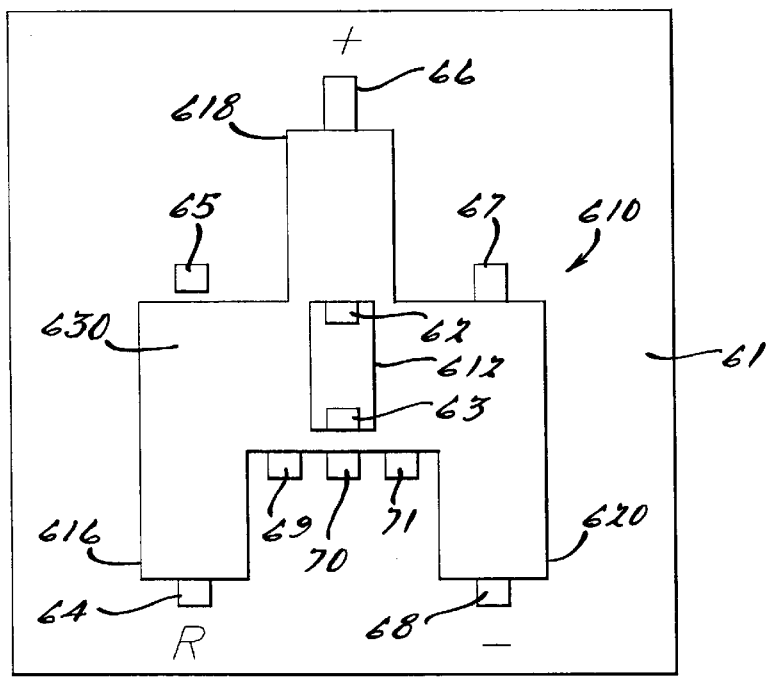
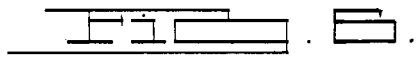
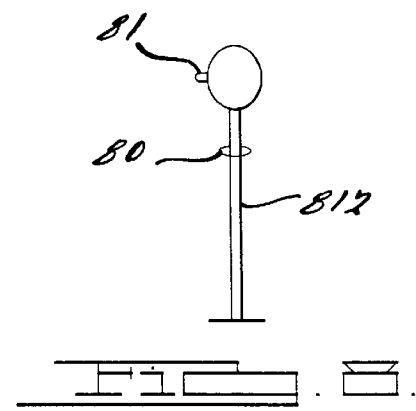
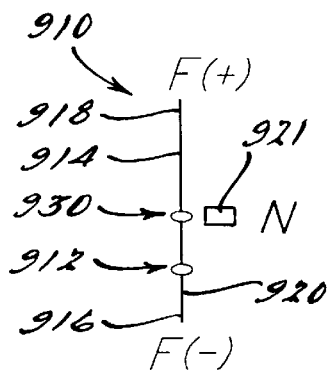
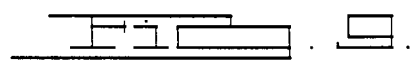
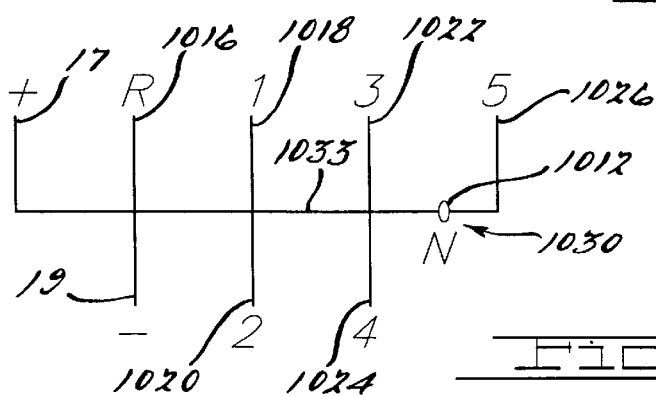

MANUAL TRANSMISSION SHIFT LEVER

BACKGROUND OF THE INVENTION

1. Field of the Invention

The present invention relates to a shift lever for a manual transmission, and more specifically to such a shift lever providing for an automatically selected skip shift.

2. Description of the Prior Art

In a conventional manual transmission, the driver mechanically selects a particular gear ratio for the manual transmission by disengaging a friction clutch and moving a shift lever to a predetermined position to engage the desired gear ratio.

To improve fuel economy and improve drivability, it is desirable to provide intervention when the driver selects a gear, such that the selected gear is determined by a computer to provide an optimal gear ratio to provide for improved efficiency. If the driver indicates an upshift is desired and the computer determines the proper gear ratio is greater than one ratio above the present ratio, when the driver request an upshift the computer will cause the transmission to upshift by two or more gear ratios.

An example of a semiautomatic mechanical transmission is included in U.S. Pat. No. 4,930,078 to Dunkley, et al ('078). In the '078 patent, the driver may select an upshift or downshift by moving the gear shift selector in a fore/aft plane. The driver may also select a skip shift by repeatedly moving the selector lever in either the fore or aft direction to select a ratio other than the next higher or lower ratio than currently engaged, but the driver must move the lever once for each ratio to be shifted. The computer of the '078 patent illuminates a display to indicate to the driver which gear ratios may be selected. The computer further prevents the driver from selecting an inappropriate gear ratio. However, any skip shift is performed only at the command of the driver.

The control shown in the '078 patent provides for a separate button to select reverse, not a conventional configuration as in most known manual transmissions. The device of the '078 patent also does not provide a conventional position of neutral. The lever of the '078 patent moves in a single fore/aft plane. The shift lever shown in the '078 patent ratchets fore/aft from a centered position to request an upshift and downshift, respectively, and returns to the centered position after the upshift or downshift is requested. Therefore, engagement/disengagement of gear ratios with a single upshift or downshift request would not be possible using a mechanical link between the lever and the transmission, because during several of the possible shifts, two shift forks must move in opposite directions, and more than one shift fork would have to be selected to perform the necessary gear engagement and disengagement.

It would be desirable to provide a manual transmission shift lever in which a computer determines and initiates a skip shift. It would also be desirable to provide a shift lever that includes conventional reverse and neutral positions. It would also be desirable to provide a lever which retains a mechanical link between the shift lever and transmission for engagement/disengagement of the gears.

SUMMARY OF THE INVENTION

It is an object of this invention to provide a manual transmission shift lever which selects skip shifts when appropriate. It is a further object to provide a shift lever having neutral and reverse positions.

Advantages of the present invention include the ability to retain a shift pattern with conventional shift gates for forward gears, neutral, and reverse. The shift mechanism provides a delay between each requested shift, thereby allowing time for a controller to calculate the proper gear ratio. The operator controls the fore/aft movement of the shift forks manually and thereby retains the feel of shifting the shift forks so a conventional manual clutch operation is performed by the driver. The present invention provides for skip shifts when appropriate, thereby improving fuel economy.

In accordance with the objects of the invention, a shift mechanism includes a shift lever for requesting a gear change, a controller for determining the proper gear ratio and for causing the proper gear ratio to be engaged when the shift lever is moved to request a gear ratio change, and a shift gate for directing the travel of the shift lever in a pattern including an upshift plane, a downshift plane, and a delay position therebetween.

BRIEF DESCRIPTION OF THE DRAWING

FIG. 1 is a schematic of a prior art manual transmission shift pattern.

FIG. 2 is a schematic of a shift pattern for a manual transmission according to the present invention.

FIG. 4B is a partial sectional side view of the shift mechanism shown in FIG. 4A.

FIG. 4C is a partial sectional rear view of the shift mechanism shown in FIG. 4A.

FIG. 4D is a partial sectional plan view of the shift mechanism shown in FIG. 4A.

FIG. 4E is a partial sectional front view of the shift mechanism shown in FIG. 4A.

FIG. 5 is a partial perspective view of a shift mechanism according to the present invention.

FIG. 6 is a schematic plan view of a circuit board for use with the present invention.

FIG. 7 is a schematic of an alternative shift pattern for a manual transmission according to the present invention.

FIG. 8 is a schematic view of a shift knob for use with the shift pattern shown in FIG. 7.

FIG. 9 is a schematic of an alternative shift pattern for a manual transmission according to the present invention.

FIG. 10 is a schematic of an alternative shift pattern for a manual transmission according to the present invention.

DESCRIPTION OF THE PREFERRED EMBODIMENTS

Figure 4A:
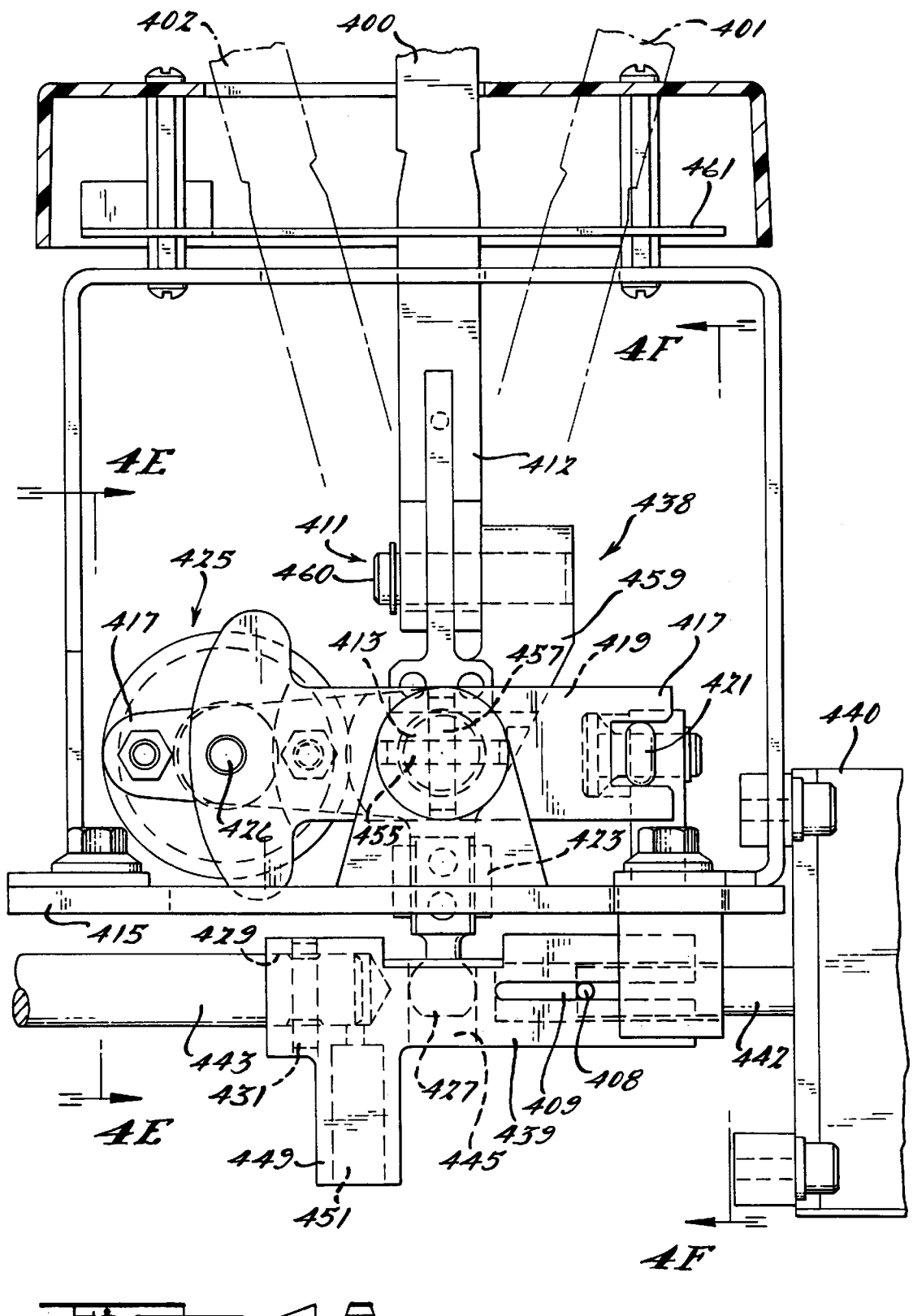
FIG. 4A is a partial sectional side view of a shift mechanism according to the present invention.
Figure 4F:
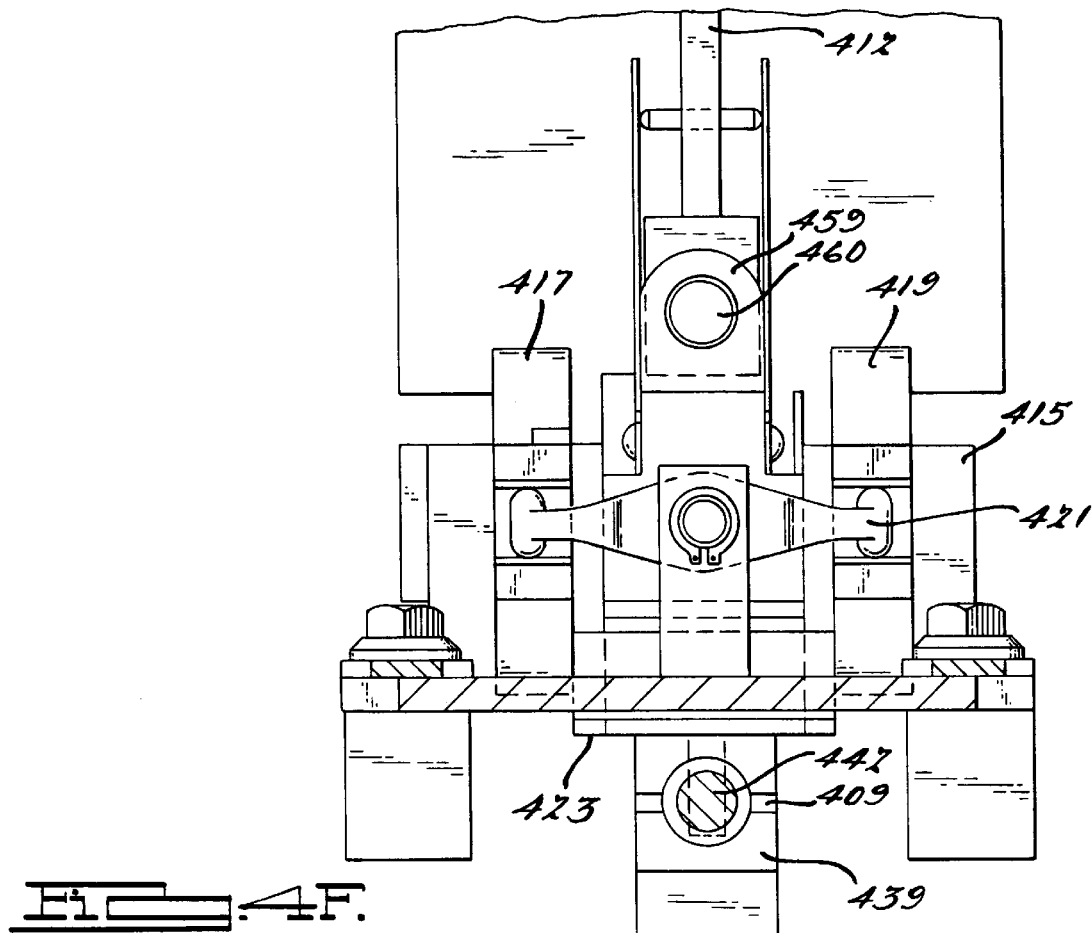
FIG. 4F is a partial sectional rear view of the shift mechanism shown in FIG. 4A.
Figure 4G:
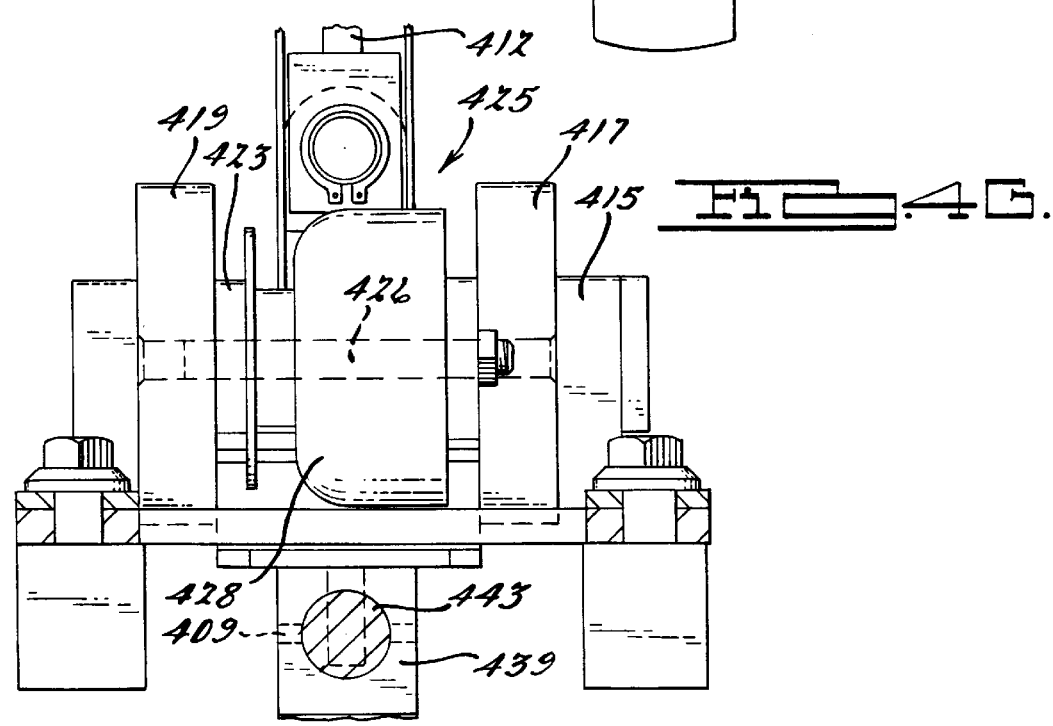
FIG. 4G is a partial sectional front view of the shift mechanism shown in FIG. 4A.

Referring to the prior art FIG. 1, a manual transmission shift pattern 10 is shown. A shift gate 14 is provided to define a pattern in which a gear shift lever 12 may travel. The lever 12 is manipulated within the gate 14 to select a particular gear ratio. The lever 12 is moved to the far left and forward position 16 to select reverse gear ratio. Likewise, forward gear ratios 1–5 are individually selected by moving the lever 12 to the position 18, 20, 22, 24, or 26, respectively, corresponding with the particular selected gear ratio, as is well known in the art. The transmission (not shown) is disengaged by moving the lever 12 to a position intermediate the above gear ratios, into a neutral position 30 within the lateral portion 33 of the shift gate 14. The lever 12 is pivotally mounted in a housing (not shown) and manipulates a manual transmission shift system for selecting shift forks 2, 4, and 6, as illustrated in FIG. 5, to engage and disengage gears as is well known in the art.

As shown in FIG. 2, a preferred skip shift pattern 210 according to the present invention is shown. This shift pattern 210 does not provide discrete positions for the forward gear ratios as in the prior art mechanism of FIG. 1, but the shift pattern 210 of the present invention has three legs arranged in somewhat of a lower case h-shape. The shift pattern 210 includes a neutral position 230 in the lateral portion 233 of the shift gate, similar to the prior art mechanism described above with reference to FIG. 1. Reverse position 216 is preferably provided in the left lower plane, or alternatively in a left upper plane (not shown). The fore/aft portion 234 includes a pair of forward ratio planes 218, 220, which enable the driver to select a forward upshift or downshift, respectively.

The terms fore and aft, as used in this application when referring to the shift lever, refer to the direction the shift lever is moved to engage a gear (as opposed to laterally, in which the gear plane is selected). The terms fore and aft, as used to refer to the shift forks, refers to the direction in which the shift fork is moved to engage or disengage the selected gear (i.e., not necessarily the fore/aft plane of the motor vehicle, particularly in a transaxle application).

When the shift lever 212 is moved to the left and aft position 216 shown in FIG. 1, reverse gear is selected. When the shift lever 212 is moved to the lateral portion 233, the transmission is disengaged in a neutral position 230. When the shift lever is moved to the forward portion 234, a forward gear ratio is requested. Within the forward portion 234, movement of the lever by the driver in an upshift plane 218 indicates the driver desires an upshift, and movement to the downshift plane 220 indicates the driver desires a downshift.

Figure 3:
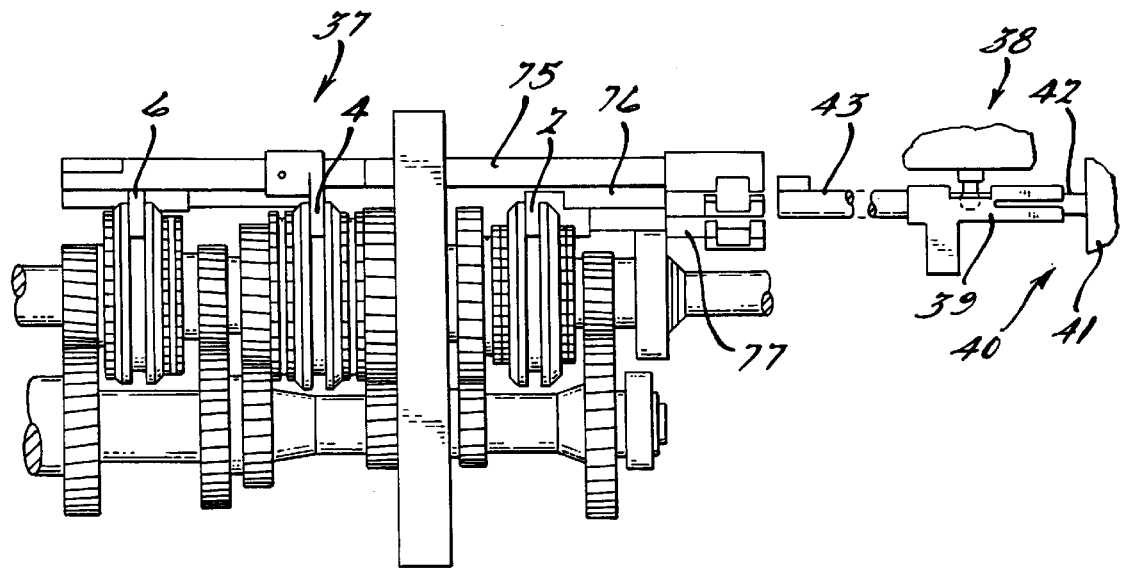
FIG. 3 is a schematic of a transmission and controller according to the present invention.
Figure 4H:
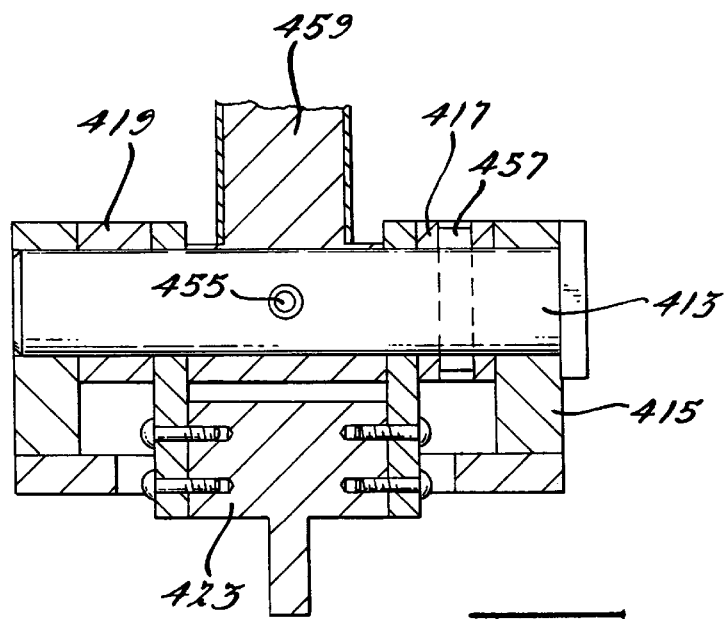
FIG. 4H is a partial sectional front view of the shift mechanism shown in FIG. 4D.

When the driver indicates a desired upshift or downshift as described above, a transmission electronic controller 36 as shown in FIG. 3 determines the proper gear ratio in which the transmission 37 optimally would operate. The controller senses several operating parameters of the motor vehicle, including but not limited to the engine speed, the vehicle speed, the operating temperature, the throttle position, and the current gear ratio. From these data, the controller 36 determines whether the vehicle is being operated in a normal or economy mode and the controller 36 will select the highest acceptable gear ratio to maximize the fuel economy in such a mode. If the controller 36 determines the vehicle is being driven in a performance mode, including hard acceleration, the controller 36 will select a lower gear ratio in accord with the current driving mode to maximize the performance. Furthermore, an override switch (not shown) may be provided in which the driver may select either an economy or performance mode in which the controller 36 is to determine gear ratios without determining whether the driver is operating the vehicle in the performance or economy mode.

In order for the driver to select either an upshift or a downshift or reverse, the lever travels through a delay position in order to provide time for the controller to select the proper shift rail and direction of travel for the selected shift fork. In the preferred embodiment shown in FIG. 2, the delay position comprises the neutral position 230. The neutral position 230 preferably comprises a portion of the shift pattern 210 which is perpendicular to, and intersects each of the upshift plane 218 and downshift plane 220. When the driver requests an upshift, the lever must be moved to the neutral position 230, either from the downshift plane 220 or from the upshift plane 218. The momentary pause in the neutral position 230 provides adequate time for the controller 36 to select the proper shift rail and direction of movement for the shift fork as described below.

When the driver desires to increase the gear ratio, the driver moves the lever 212 forward, as shown in FIG. 2, in the upshift plane 218 to indicate an upshift is desired. The controller 236 determines the optimal gear ratio for fuel efficiency and performance and enables the transmission 37 to engage the optimal gear ratio. Thus, if the vehicle is operating in second gear and has achieved an engine rotation which would operate efficiently in a fourth gear ratio and the vehicle is being driven in a normal mode, when the driver indicates an upshift the controller will initiate a shift directly from second gear into a forth gear ratio, skipping the third gear ratio, thereby performing a skip shift. If the controller 36 determines the driver is operating in a performance mode, the requested upshift will produce an upshift into third gear only (only one ratio change for each requested upshift), as the skip shift function is preferably disabled in the performance mode.

The driver may also manually request a shift into a ratio higher than the next ratio, or a manual skip shift. For example, to indicate an upshift skip shift is desired, the driver will move the lever 212 from its current position, either in the upshift 218 or downshift 220 plane, through the neutral plane 233, to the upshift plane 218, back to the neutral plane 233 and return to the upshift plane 218. The controller 36 will determine the driver has requested an upshift of two gear ratios. In a preferred embodiment, the controller will perform the exact requested shift of two gears, regardless of whether the requested gear ratio is proper, thereby acting as a conventional manual transmission wherein the driver may select a particular gear ratio. In an alternative embodiment, the controller 36 continues to override the driver where an improper ratio is indicated (for example, if the engine RPMs are too high to downshift into the selected ratio) and the controller 36 selects the proper gear ratio, thereby preventing the driver from selecting an improper ratio for the current operating conditions.

In a preferred embodiment, the lever 212 remains in the selected position after a shift is requested. For example, if an upshift is indicated, the lever 212 remains at the forward position in the upshift plane 218. Thus, to request a downshift, the driver must move the lever 212 from the forward position of the upshift plane 218 to the neutral plane 233, then to the right into the downshift plane 220 and rearwardly as shown in FIG. 2. Thus, the lever must travel rearwardly into the neutral plane 233 and reverse direction to a forward motion to request an upshift. Alternatively, to request a downshift, the lever 212 must move rightwardly in the neutral plane. The momentary delay provided in the reversal of direction of the shift lever to request the upshift or rightward motion to move to the downshift lane provides enough time for the controller 36 to evaluate the vehicle operating parameters and make a determination of the appropriate gear ratio for the requested shift. The transmission may be shifted using a cable system, a rod shifter, or a transmission mounted shifter, each of which are well known in the art.

As shown in FIG. 3, the controller 36 determines which gear ratio is to be selected for the requested shift. The controller 36 determines which shift fork in the transmission 37 moves the particular gear to be engaged and whether the particular shift fork needs to be moved in either the fore or aft direction to engage the proper gear ratio. The controller 36 sends signals to a pivot change mechanism 38 and a shift fork selector mechanism 40 once the correct shift fork and proper direction to move the shift fork are determined, the operation of each being described further below.

The pivot change mechanism 38 comprises a device which produces a fore or aft movement of the selected shift fork. The pivot change mechanism 38 converts either fore or aft movement of the shift lever 12 to either fore or aft movement of the selected shift fork as determined by the controller 36. Thus, a fore movement of the lever 12 when requesting an upshift, as illustrated in FIG. 2, may require either a fore or aft movement of the selected shift fork. The necessary direction is provided by the pivot change mechanism. The pivot change mechanism retains a mechanical connection between the shift lever 12 and the shift forks so the driver provides the input motion to move the forks. The driver therefore obtains direct feedback in the fore/aft planes from the forks when the selected gear is engaged, as in a conventional manual shift system, so the driver is able to operate the manual clutch accordingly.

The shift fork selector mechanism 40 receives a signal from the controller 36 to select the proper shift fork to be moved fore/aft as described above. The mechanical movement of a known conventional crossover mechanism is replaced by this selector mechanism 40. In a conventional manual transmission typically three shift rails are provided to carry three shift forks to provide five forward gear ratios and a reverse gear ratio. The selector mechanism 40 has three positions to move the fore/aft motion from the pivot change mechanism 38 to a particular shift rail as determined by the controller 36. Thus, the controller can control the proper shift rail to be moved, and thus the gear to be engaged; whereas a conventional transmission with full mechanical coupling between the lever would not enable the controller to select the proper shift rail and proper gear ratio, because this is mechanically selected by the driver.

In a preferred embodiment, as shown in FIG. 2, when the lever 12 is moved from the upshift position 218 to the neutral plane 233, the lever pulls or pushes a shift fork to disengage the currently selected gear. Once in the neutral plane, the controller 36 monitors the operating conditions and determines the optimal gear for the current operating conditions and moves the shift fork selector mechanism 40 to select the proper shift rail for the correct gear ratio. The controller engages the pivot change mechanism 38 to impart the proper fore or aft movement of the selected shift fork when the lever is moved in the fore/aft plane. Thus, when the operator pushes the lever 212 forward for an upshift, the motion of the lever 212 is transmitted through the pivot change mechanism 38 in the proper direction to the proper shift fork.

If the operator moves the lever within the neutral plane 233 to the right position, the controller 36 determines a downshift will be requested and therefore calculates the proper ratio for a downshift and sends the appropriate signals to the pivot change mechanism 38 and the fork selector mechanism 40 as described above for an upshift.

As shown in FIGS. 4A–4I, a preferred pivot change mechanism 438 for a shift lever assembly 411 is shown. The pivot change mechanism 438 converts a fore or aft movement of the shift lever 412 into either a fore or aft movement of a shift block 439. The shift block 439 is connected to a control rail 443 which moves a shift fork (not shown) in the proper direction. The shift fork selector mechanism 440 is also connected to the block 439. The shift fork selector mechanism 440 creates rotation of the block 439 to select the proper shift plane to engage the proper shift fork. A pin 408 provided on the selector mechanism 440 engages a slot 409 provided in the block to provide rotation thereof. The slot 409 also permits relative fore/aft movement of the block 439 to the selector mechanism 440 when the lever assembly 411 causes fore/aft movement of the block 439.

The shift lever assembly 411 includes a shift lever 412 connected to a shaft 413 rotatably supported by a housing 415. The lever 412 is rotatably supported by a pin 460 press fit to a second lever 459. The lever 412 is thereby able to rotate perpendicular the plane illustrated in FIG. 4A about the pin 460. The pin 460 also causes rotation of second lever 459 with lever 412 when lever 412 is rotated about the axis of the shaft 413. A first lever 417 is pinned at 457 to the shaft 413 and rotates therewith. A second lever 419 is provided parallel the first lever 417 and is rotatably supported by the shaft 413. A transverse lever 421 is supported by the housing 415 and engages a slot provided in an end of each of the first and second levers 417, 419. As the shift lever is pulled from a neutral position 400 to a rearward position 401, the shaft 413 and first lever 417 rotate clockwise as viewed in FIG. 4A. With such a rearward movement of the lever 412, the first lever 417 causes the transverse lever 421 to rotate counterclockwise as viewed in FIG. 4C. The transverse lever 421 then imparts a counterclockwise rotation of the second lever 419 as shown in FIG. 4A.

A gimbal 423 is rotatably supported by the shaft 413 between the first and second levers 417, 419. A selector mechanism 425 is preferably carried by the gimbal 423. The selector mechanism 425 carries a means for selectively engaging the gimbal 423 and one of the levers 417, 419. Thus as the selector mechanism 425 engages the one of the levers 417, 419, the direction of rotation of the gimbal 423 matches the rotation of the lever 417 or 419 which the selector 425 has engaged, thereby imparting either a clockwise or counterclockwise rotation in the gimbal 423, regardless of the direction of rotation of the shaft 413 imparted by the shift lever 412 from either a fore or aft movement by the driver. In a preferred embodiment, the selector mechanism 425 comprises a solenoid 428 having a pin 426 which projects alternatively from either side of the solenoid to selectively engage a corresponding hole in each of the levers 417, 419. As shown in FIG. 4E, the pin 426 is presently engaging the lever 419 on the leftmost side.

When the gimbal 423 is rotated clockwise or counterclockwise, an arm 427 extending downwardly from the gimbal 423, as shown in FIG. 4A, is likewise rotated. The arm 427 serves the function of pulling or pushing a control rail 443 or cable which in turn moves a shift fork in the transmission in the desired fore or aft direction as is known in the art. The pivot change mechanism 438 as described above permits the controller 36 to send a signal to the selector mechanism 425 to engage a lever 417 or 419 and thereby impart the desired fore/aft directional movement upon the arm 427 for a given movement of the selector lever 412 when the lever 12 is moved by the driver.

As the driver moves the lever 12 in the forward direction 402 to indicate an upshift, the arm 423 may move either forward or rearwardly to move a synchronizer in the proper direction to engage the proper gear ratio. Likewise, as the lever 412 is moved rearwardly from the upshift position to a neutral position 400, the mechanism 438 determines which direction the arm 423 shall pull or push a synchronizer to disengage the presently engaged gear.

In the example shown in FIGS. 4B–4H, the solenoid pin 426 engages the left lever 419. As the lever 412 is moved rearwardly to 401, a downshift is requested. Lever 419 rotates counterclockwise as described above. The gimbal 423, being pinned to the second lever 419 also rotates counterclockwise as shown in FIG. 4B, pulling the block 439 rearwardly. This will result in the selected synchronizer (not shown) to likewise be pulled rearwardly. Alternatively, as shown in phantom in FIG. 4B, if the solenoid pin 426 engages the first lever 417, the gimbal 423 would rotate clockwise as viewed in FIGS. 4A–4B, thereby moving block 439 forward (not shown) with a rearward movement of the lever 412.

The preferred pivot change mechanism 438 described above retains a mechanical linkage between the shift lever 412 and the transmission 37. Thus the energy to make a gear engagement is provided by the motion imparted into the shift lever 412 by the driver through a block 439 and control rail 443 or cable. This removes the need to otherwise have a separate actuator to move the synchronizers fore/aft to engage or disengage the gears. Furthermore, this linkage provides feedback to the driver during a shift so the driver is aware when the gear is engaged and therefore is able to operate a conventional clutch properly.

One skilled in the art recognizes the pivot change mechanism 38 described above may comprise any equivalent means to selectively impart either a fore or aft movement to a shift fork from either a fore or aft movement of the shift lever 12 as described above. An example of an alternative mechanism includes a gear mechanism having an input gear rotated by the lever. The input gear rotates a pair of output gears in an opposing manner. One of the output gears is be selected to produce an output to the control rail in a first direction for a given movement of the shift lever and the other of the output gears is selected to produce an opposite motion as described above for the pivot change mechanism shown in FIG. 3. Alternatively, one output gear engages the input gear and opposing sides of the output gear are selected to produce opposing output movements from a given input into the selector lever. Any number of variations of the pivot change mechanism designs described above may be used to provide selectably reversible linear movement of the control rail or cables.

The fork selector mechanism 40, as described above, selects which fork will be moved. As is known in the art, the gear selector mechanism may take several forms, including a cable system, a rod shifter mechanism, a transmission mounted shifter, or a similar device in which a particular shift fork is selected to engage a desired gear.

In a preferred embodiment, a shift fork selector mechanism 40 is provided which is adaptable for use with each of the above gear selector mechanisms. A preferred fork selector 40 as shown in FIG. 5 includes a three position solenoid 41 with shaft 4 which imparts a rotary motion upon a control rail 43 to engage the proper shift rail 75, 76, 77 in the transmission 37. Alternatively, any three position actuator, including a three position stepper motor, may be used in place of the solenoid 41 to select the proper shift rail. Or the three position solenoid may push or pull a cable to select the proper shift rail.

In the preferred embodiment shown in FIG. 5, the output of the pivot change mechanism 38 and shift fork selector mechanism 40 engage a main block 39. The main block 39 includes a first end which engages the control rail 43 of the shift mechanism in a fixed manner. Preferably, the control rail 43 engages a first axial bore 429 shown in FIG. 4B in the first end of the block 39 and a pin 431 radially projects through both the rail 443 and the block 429 to prevent relative rotation and axial movement therebetween. The second end of the block includes a second axial bore 435 into which the shaft of the stepper motor 440 projects. The shaft of the stepper motor 440 includes a pin 408 projecting radially therefrom. The second end of the block 439 includes an axial slot 409 extending from the second end toward the first end. The pin 408 on the stepper motor 440 engages the axial slot 409, and is therefore able to input a rotary motion into the block 439 and subsequently into the control rail 443 as described above. The axial slot 409 permits relative axial movement of the block 439 to the stepper motor 440 shaft. The block 439 further includes a rectangular hole 445 projecting from the top of the block 439. The finger 427 of the gimbal 423 engages the rectangular hole 445 in such a manner that the rotary movement of the finger 427 imparts an axial movement of the block 439. The rectangular hole 445 provides clearance from side to side of the finger 427 so that the rotary movement of the block 439 produced by the stepper motor 440 is not impeded by the finger 427 projecting into the rectangular hole 445. The block 439 further includes a downstanding portion 449 which includes a third bore 451. Inside the third bore 451 are provided a spring and ball (not shown) which engage corresponding features on the shift lever assembly 411 to provide detents for the shift positions.

As further shown in FIG. 3, the shift lever assembly 11 includes a circuit board 61 through which the lever 12 passes. A schematic plan view of the circuit board is shown in FIG. 6. A shift pattern 610 similar to that described above in FIG. 3 is illustrated in FIG. 6, but any pattern may be used with the board 61. The shift pattern 610 has a lower left position 616 to select reverse, a central forward position 618 to select an upshift, a lower right position 620 to select a down shift and a lateral plane 630 to select neutral as described above. The shift lever 612 carries magnets 62, 63 which pass by Hall Effect sensors 64–71 carried on the circuit board 61 which is preferably provided on the underside of the lever assembly 11. The sensors 64–71 are provided at positions corresponding with the reverse position 64, the neutral plane directly above reverse 65, the upshift position 66, the downshift position 68, the neutral plane directly above the downshift position 67 and intermediate positions along the neutral plane 69, 70, 71. These sensors determine the position where the shift lever 612 is held. Thus, when the driver makes a request for an upshift, downshift or reverse as described above, the sensors 64–71 send a signal to the controller 36 which then actuates the pivot select mechanism 38 and fork select mechanism 40 as described above. The sensors provided along the neutral plane 69, 70, 71 advise the controller 36 when the operator is moving from one operation (i.e., reverse, upshift or downshift) to another of these operations. Thus the controller 36 is able to send an appropriate signal to the pivot and selection mechanisms 38, 40 in a timely manner when such an event occurs, before the sensor 65, 70, 67 at the particular end of the shift gate is reached.

FIG. 7 illustrates an alternative shift pattern 710 according to the present invention. Reverse gear is selected by moving the lever 712 downward and rightwardly 716 while lifting a reverse lift ring (shown in FIG. 8 at 80) or pressing a button (shown in FIG. 8 at 81) on the shift lever 812 as is known in the art. Neutral 730 is in the lateral plane of the shift gate 714, providing a delay position as described above with reference to FIG. 2. Forward is selected by moving the lever 712 from neutral 730 to either the upshift or downshift planes 718, 720. An upshift is indicated by moving the lever left and up 718 and a downshift is selected by moving the lever down and to the right 716 when the lift ring 80 or button 81 are not engaged. As further described above, the controller 36 may intervene to determine the proper gear ratio.

Figure 11:
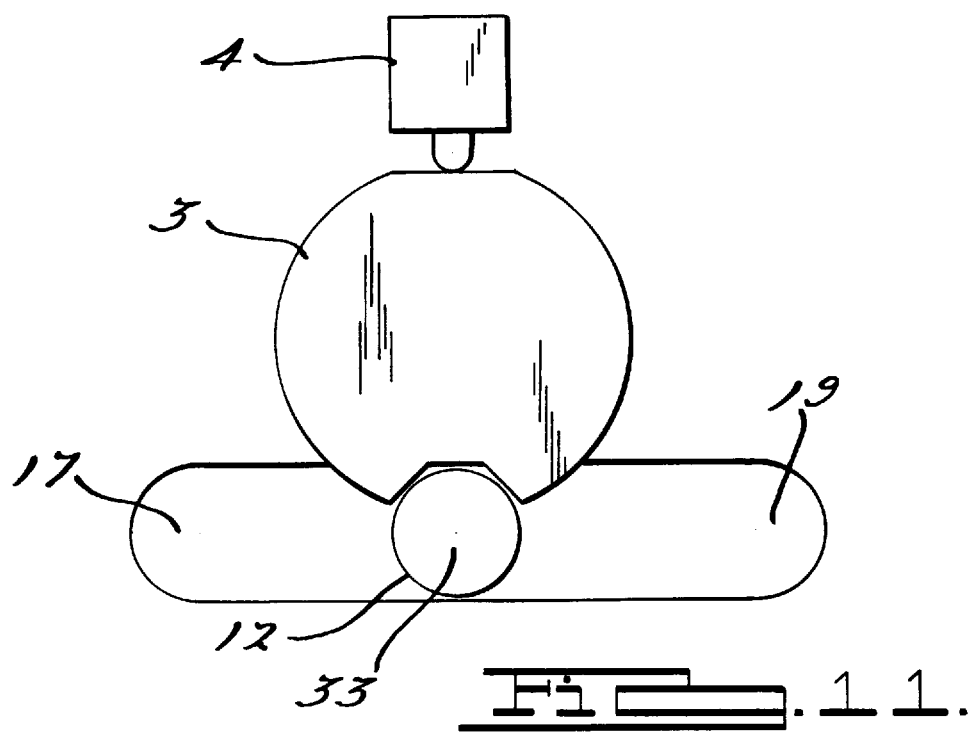
FIG. 11 is a schematic representation of a cam operated detent.
Figure 12:
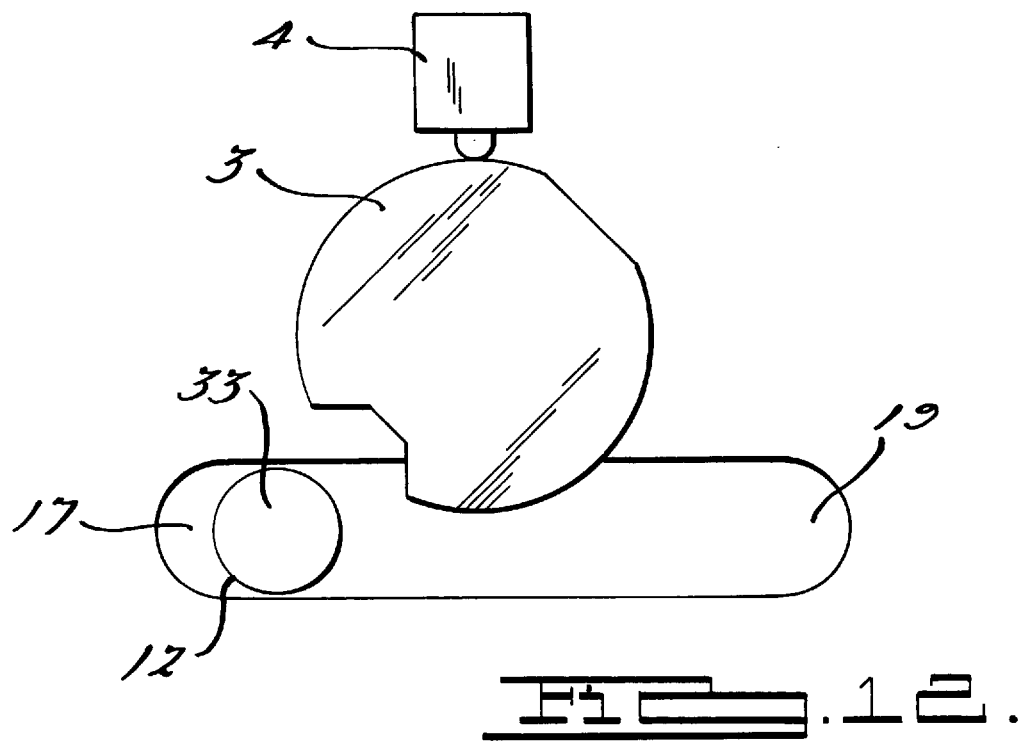
FIG. 12 is a schematic representation of the cam of FIG. 11 rotated out of the delay position.

FIG. 9 illustrates a further alternative shift pattern 910 according to the present invention having a single fore/aft plane 914. Reverse gear is selected by moving the lever 912 rearward 916 while lifting a reverse lift ring 80 or pressing a button 81 as described above with [re]respect to FIG. 8. Neutral 930 is provided between the extreme fore/aft positions 918, 920. An upshift is selected by moving the lever 912 forward 918. A downshift is indicated by pushing the lever rearward 920. A detent position exists at the center of the neutral plane [93"] 930 to provide a delay position which allows the controller 36 to monitor the vehicle operating parameters and select the proper shift rail and direction of travel for the shift fork as described above. The detent position may be provided using a spring loaded detent as known to one skilled in the art and represented schematically in FIG. 9 at 921. Once the controller 36 sends the appropriate signal to the plane and pivot change mechanisms 40, 38, the lever 912 is released from the delay (neutral, 930) position. Alternatively, any forward gear change request flows from one extreme position 918 or 920 to the opposite extreme position through the delay position. As the lever 912 moves toward the delay position, the present shift fork is moved to disengage the current ratio. At the delay position, the proper plane and direction are selected by the controller 36 as described above and when the lever 912 is released to the opposite extreme position, the proper shift fork is moved in the proper direction. The delay is preferably provided by a rotary cam 3 connected to a solenoid 4 in a manner known to one skilled in the art, one example of which is illustrated in FIGS. 11 and 12. Thus, when the lever 912 moved through the center position 930, the cam 3 is rotated and the solenoid 4 is actuated to lock the cam 3 and lever 12 in this position momentarily for the necessary calculations described above to be performed. When the calculations are complete, the solenoid 4 is released and the cam 3 is able to rotate to release the lever [912] 12 so the driver is able to move the lever 12 in the desired direction.

Alternatively, the skip shift patterns described above may be added to a conventional shift pattern. An exemplary shift pattern is shown in FIG. 10. In this embodiment, the skip shift pattern illustrated in FIG. 7 is combined with the conventional H-shaped shift pattern illustrated in FIG. 1, where the skip shift pattern is added to the left end of a conventional manual shift pattern. Thus, the driver may elect to drive the transmission in the conventional pattern for performance driving and use the skip shift pattern for economy driving. In this embodiment, when the lever 12 is moved leftwardly into the skip shift portion, the plane selection is decoupled from the shift lever, and the plane selection is performed by a selector mechanism as described above.

In a further alternative embodiment, a conventional shift pattern as shown in FIG. 1 is provided. The lever 12 is provided with a button 81 as shown in FIG. 8 to select a skip shift mode. In the skip shift mode, a conventional manual plane selector is decoupled from the lever and the plane selection is performed with a selector mechanism as described above. Two of the forward gear planes of a conventional manual H-shaped pattern as shown in FIG. 1, are used as the upshift and downshift planes and the lever 12 functions as an upshift/downshift selector as described with reference to FIG. 7. Preferably, the two forward planes comprise first 18 and fourth 24, as viewed in FIG. 1.

The above embodiments are preferably practiced using a conventional manual or hydraulic clutch (not shown), providing the driver with the feel of a conventional manual transmission and clutch. However, the use of an automatic clutch, such as an electrohydraulic clutch may be used to further automate the disclosed gear selection mechanisms.

Although the preferred embodiments of the present invention have been disclosed, various changes and modifications may be made without departing from the scope of the invention as set forth in the appended claims.

We claim:

1. A shift mechanism for requesting an upshift and a downshift in a multiple gear ratio transmission of a motor vehicle having a plurality of shift forks, each of the shift forks being moveable along the longitudinal axis of the transmission to engage a gear ratio, the shift mechanism comprising:

a shift gate including a pattern having an upshift plane with an upshift position and a downshift plane with a downshift position;

a shift lever moveable in the shift gate to the upshift position and to the downshift position for requesting a gear ratio change, the shift lever operatively connected to the transmission to move one of the shift forks to engage one of the multiple gear ratios when an upshift or downshift is requested and for moving one of the shift forks to disengage one of the multiple gear ratios when the lever is moved from the upshift and downshift positions;

a controller for determining the proper one of the multiple gear ratios to be selected, the proper one of the shift forks to be moved, and the proper axial direction in which to move the proper shift fork when the shift lever is moved to request a gear ratio change, the controller causing the proper shift fork to be selected and causing the shift fork to be moved in a proper direction when the shift lever is moved to request the gear ratio change.

2. A shift mechanism according to claim 1, wherein the shift gate further comprises a delay position provided the upshift plane and downshift plane through which the shift lever travels from one of the upshift plane and downshift plane when an upshift or downshift is requested.

3. A shift mechanism according to claim 2, wherein said upshift plane and downshift planes are substantially parallel and said delay position comprises a third plane intersecting said upshift and downshift planes.

4. A shift mechanism according to claim 3 wherein said third plane is substantially perpendicular to said upshift and downshift planes.

5. A shift mechanism according to claim 4 wherein a reverse plane is provided substantially parallel said upshift and downshift planes.

6. A shift mechanism according to claim 2 wherein a reverse button is provided to select reverse gear when the button is depressed and the lever is moved in one of the first and second planes.

7. A shift mechanism according to claim 2 wherein the controller generates a first signal to operate a solenoid to select a proper shift rail for the proper gear ratio and a second signal to operate a pivot change mechanism for the lever to move the shift rail in the proper direction to engage the proper gear ratio.

8. A shift mechanism according to claim 7 wherein the lever is mechanically linked to the shift forks, such that a movement of the lever out of one of the upshift or downshift positions pulls a shift fork to disengage the engaged gear ratio.

9. A shift mechanism according to claim 7 wherein the pivot change mechanism comprises:

a housing;

a shaft rotatably supported by the housing, said shaft supporting the shift lever for rotation relative to said housing;

a first rocker lever supported by the shaft;

a second rocker lever provided adjacent the first rocker lever and rotatably supported by the shaft;

a transverse lever provided substantially parallel the shaft having a first end operatively connected to the first rocker lever and a second end operatively connected to the second rocker lever;

a gimbal rotatably supported by the shaft; and a selector means for alternatively connecting the gimbal to one of the first and second rocker levers.

10. A shift mechanism according to claim 9, wherein the selector means comprises a solenoid supported by the gimbal.

11. A shift mechanism according to claim 2 wherein said upshift plane and downshift planes are provided in the same plane and said delay position comprises a detent between said upshift and downshift planes.

12. A shift mechanism according to claim 11 wherein said delay position comprises a rotatable cam engageable with the shift lever and a solenoid engageable with the cam to prevent rotation thereof.

13. A shift mechanism according to claim 2 wherein said upshift plane and downshift planes comprise two of the shift planes provided in a conventional H-shaped manual shift pattern.

14. A shift mechanism according to claim 2 wherein said upshift plane and downshift planes comprise two shift planes provided adjacent and parallel a conventional H-shaped manual shift pattern.

15. A method of selecting a gear ratio in a vehicle having a shift lever traveling in a shift gate, comprising:

moving the shift lever a first direction from a neutral position in the shift gate to select an upshift;

moving the lever in a second direction from a second neutral position in the shift gate to select a downshift; and delaying the lever in one of said first and second neutral positions to calculate a proper shift rail to move, calculate a proper direction to move the shift rail, send a signal to a fork selector mechanism to select the proper shift rail, and send a signal to a pivot change mechanism to select the proper direction in which to move the shift rail.

* * * * *